UNITED STATES PATENT OFFICE.

FRANCIS HALL, OF TACOMA, WASHINGTON.

METHOD OF PRESERVING WOOD.

SPECIFICATION forming part of Letters Patent No. 506,493, dated October 10, 1893.

Application filed September 29, 1892. Serial No. 447,324. (No specimens.)

*To all whom it may concern:*

Be it known that I, FRANCIS HALL, of Tacoma, in the county of Pierce and State of Washington, have invented a new and useful Improvement in the Treatment of Wood for Protection from the Teredo and for other Purposes, of which the following is a full, clear, and exact description.

My invention consists in a process for treating wood and other vegetable substances for various purposes which will render them impervious to the destructive attacks of worms, molluska, insects and all forms of animal life, which attack and destroy them when in their natural condition. My process also renders the same substances less inflammable.

My invention relates more particularly to the treatment of wood for protecting it from the ravages of the teredo. I will describe it more particularly as applicable to protection from the teredo although it is to be understood as applying as well to protection from other forms of animal life. It is a known fact among chemists and botanists that most woods or vegetable substances, are composed of four classes of compounds, namely fiber, sugar, gums and resins. My experiments have indicated that the parts of woods which are utilized by the teredo and other destructive forms of animal life are the last three or the sugars, gums and resins, the fiber being non-nutritious and rejected. Not all kinds of wood contain all three of these but all kinds contain one or more and are consequently subject to attack from the teredo. The object which I seek to obtain is the removal of certain of these substances and the alteration of the forms of the remaining so that they may not act as food for the teredo or other wood boring animals. The manner in which I secure this result is as follows: The wood to be treated, is placed in a vat, tank or other receptacle, preferably though not necessarily closed, containing a solution in water of an alkaline hydrate and an alkaline carbonate. These may be either the hydrate and carbonate of soda or of potassium or the carbonate of one and the hydrate of the other. The reaction is also assisted by using in addition a solution of certain alkaline salts as sodium silicate, sodium aluminate, alkaline chromates and manganates, sodium arsenite or arsenate, sodium sulphide or sodium sulphide solution of metallic sulphides. The action of this solution upon the wood is as nearly as can be determined as follows: The hydrated or caustic alkali acts upon the resins to form compounds which are soluble in the solutions of the alkaline carbonates, and are by them extracted from the wood. The gums are also acted upon by the alkaline hydrates to form compounds which are insoluble in the alkaline solutions and are also insoluble in sea water. The formation of these latter compounds also renders them unfit to sustain the life of wood boring animals. The sugars are soluble in the solution and are extracted thereby. The wood being treated is immersed in the solution which should be kept at a temperature of about 200° Fahrenheit for a length of time proportionate to the depth to which it is desired to have the treatment extended when it is removed, and is immediately ready to be used. Different kinds of wood will require different lengths of time for the same result. The action may be hastened by alternately removing the pressure of the air and then increasing the pressure but this is not essential to the reaction.

In the treatment of green fir for piling the solution should have essentially the following proportions: To each cubic foot of water are dissolved one and three-fourths pounds of sodium hydrate or caustic soda, four pounds of soda ash, and one-fourth pound of arsenic sulphide in a saturated sodium or potassium sulphide solution. It is of course understood that these amounts refer to the pure chemical and when as in practice the commercial or impure product is used an amount should be used which is equivalent to those given. The green fir piles are placed in an iron tank and completely submerged in this solution which is by the use of steam coils kept at a temperature of from 200° to 210° Fahrenheit for a sufficient length of time to carry the reaction to the desired depth, it requiring from sixteen to twenty hours to penetrate one inch of the green fir. The same result may be obtained in a cold solution but the time required will be longer. Besides protecting the wood from the destructive action of the teredo it also acts to prevent the attachment of barnacles and other molluska thereto. Having removed the resinous properties of the wood and also deposited within its substance certain of these mineral compounds the wood is also rendered less inflammable.

Having thus described my invention, what I claim, and desire to secure by Letters Patent, is—

1. The herein described process of treating wood for commercial purposes which consists in submitting the same to the action of a solution of alkaline hydrates in connection with alkaline carbonates and one or more of the following salts, alkaline aluminates, alkaline silicates, alkaline chromates, alkaline arsenates or arsenites, alkaline sulphides or alkaline sulphide solution of metallic sulphides, substantially as hereinbefore described.

2. The herein described process of treating wood which consists in immersing it in a hot solution containing to each cubic foot of water approximately the following amount of the substances named, namely: one and three-fourths pounds of sodium or potassium hydrate, four pounds of soda ash, and one-fourth pound of arsenic sulphide dissolved in sodium sulphide solution, substantially as hereinbefore described.

FRANCIS HALL.

Witnesses:
JAMES H. PARKER,
W. W. POWELL.